United States Patent [19]
Johnston

[11] Patent Number: 4,897,512
[45] Date of Patent: Jan. 30, 1990

[54] EXTENSION CORD APPARATUS

[76] Inventor: Bobby J. Johnston, 6419 Bandera #1, Dallas, Tex. 752253-3703

[21] Appl. No.: 182,727

[22] Filed: Apr. 18, 1988

[51] Int. Cl.⁴ .................. H02G 11/02; B65H 75/34
[52] U.S. Cl. .................. 191/12.4; 242/107.12; 242/129.62; 242/158.3
[58] Field of Search .............. 191/12.4, 12.2 R, 12 R; 242/86, 86.8, 107.12, 107.4 D, 107.4 E, 129.53, 129.62, 158 R, 158.3, 80

[56] References Cited

U.S. PATENT DOCUMENTS

| | | | |
|---|---|---|---|
| 3,858,011 | 12/1974 | Salvin et al. | 191/12.2 R |
| 3,876,045 | 4/1975 | Knarreborg | 191/12.4 X |
| 3,980,252 | 9/1976 | Tae | 242/158.3 |
| 4,072,278 | 2/1978 | Petersen | 191/12.2 R X |
| 4,417,703 | 12/1983 | Weirhold | 242/107.12 |
| 4,721,833 | 1/1988 | Dubay | 191/12.4 |

Primary Examiner—Johnny D. Cherry
Assistant Examiner—Dean J. Kramer
Attorney, Agent, or Firm—Kanz, Scherback & Timmons

[57] ABSTRACT

Improved storage apparatus for electric extension cords and the like that includes a reel for storing a power cord or pig tail, a second drum for storing the extension cord, and that further includes level wind apparatus which uniformly locates the extension cord on the second drum whereby long cords can be stored in a relatively small space without tangling.

1 Claim, 1 Drawing Sheet

EXTENSION CORD APPARATUS

BACKGROUND OF THE INVENTION

This invention relates generally to improved storage apparatus for electric extension cords and the like. More particularly, but not by way of limitation, this invention relates to an improved extension cord storage apparatus wherein the cord is easily extended to the desired length and wherein the cord is power reeled back into the storage apparatus.

Apparatus for storing electric extension cords have been constructed in the past as exemplified by U.S. Pat. Nos. 3,093,341 issued June 11, 1963 to Adolph Meletti; 3,346,703 issued Oct. 10, 1967 to J.E. Slinkered et al; and 3,929,210 issued Dec. 30, 1975 to Morris Cutler et al. Such devices have operated generally satisfactory.

However, when the reel on which the cord is stored is totally enclosed and when long cords 50 to 100 feet or longer are to be stored, problems have arisen in attempting to rewind the cord onto the reel evenly and smoothly so that the cord can be stored in the smallest space possible. Long cords also tend to tangle badly.

In addition, a problem has existed in that with such devices, a power cord or pig-tail, which extends from the extension cord storage apparatus to connect the extension cord into the electrical power circuit, has generally been relatively short because no provision has been made for the storage of such power cords or pig-tails if they are of any substantial length.

An object of this invention is to provide an improved electric extension cord storage apparatus that incorporates a level wind device for assuring that the cord, as it is being reeled, is smoothly and evenly wound on the drum or storage reel. Also, the apparatus of this invention includes a storage drum or reel that is also power rewound for containing the power cord.

SUMMARY OF THE INVENTION

This invention then provides an improved electric extension cord storage apparatus that includes a hollow housing; first reel means having a shaft journaled in the housing and a drum mounted on the shaft for receiving the power cord; a second reel having a second shaft journaled in the housing and a second drum on the second shaft for receiving the extension cord; means in the housing for electrically connecting the power cord and extension cord; and cord distributor means located in the housing for positioning the extension cord substantially uniformly on the second drum.

BRIEF DESCRIPTION OF THE DRAWING

The foregoing and additional objects and advantages of the invention will become more apparent as the following detailed description is read in conjuction with the accompanying drawing wherein like reference characters denote like parts in all views and wherein.

DETAILED DESCRIPTION OF THE PREFERRED EMBODIMENT

Figure 1:
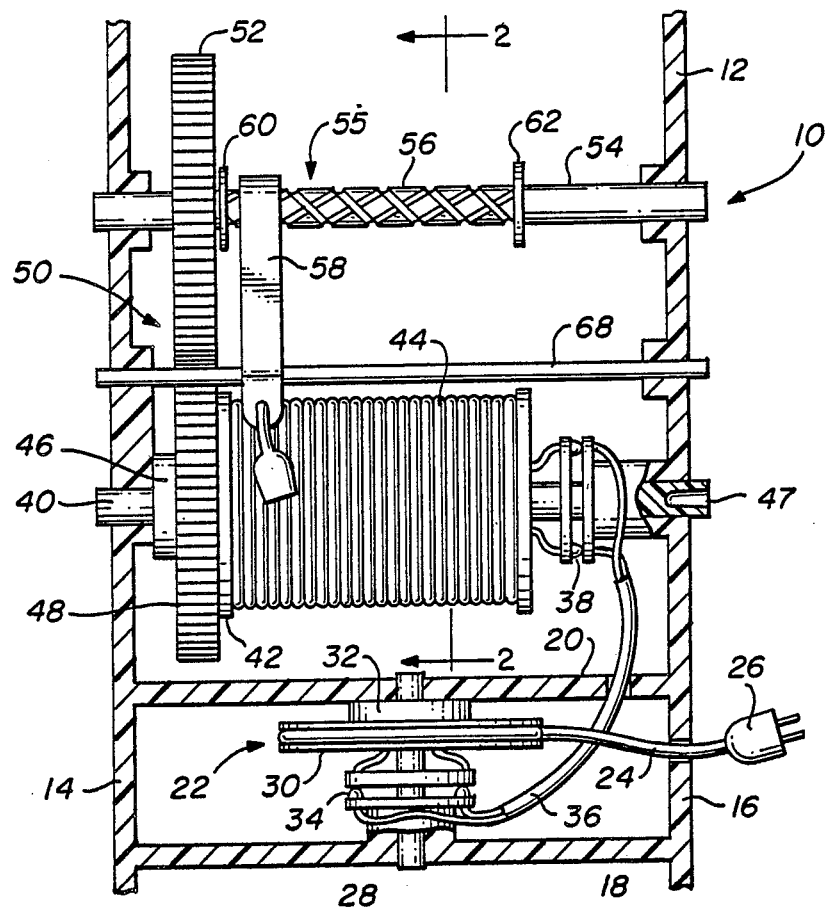
FIG. 1 is a front view, somewhat schematic, partly in elevation and partly in cross-section, of improved storage apparatus that is constructed in accordance with the invention.

Referrring to the drawing and to FIG. 1 in particular, shown therein and generally indicated by the reference character 10 is an extension cord storage apparatus that is constructed in accordance with the invention. The apparatus 10 includes a hollow housing 12, which is only partially illustrated.

As shown, the housing 12 includes sidewalls 14 and 16, a bottom 18, and an intermediate horizontal wall 20. Disposed between the bottom 18 and the wall 20 is power cord reel means 22 upon which a power cord 24 is reeled. As shown, the power cord 24 also includes a plug 26 suitable for insertion into a power socket (not shown).

The reel means 22 includes a shaft 28 that extends between the wall 20 and the bottom 18 and is journaled therein. Located on the shaft 28 is a drum 30 upon which the power cord 24 is disposed. Located between the wall 20 and the drum 30 is a rewind and latch assembly which generally contains a coil spring (not shown) and a releasable latch (not shown) that permits the power cord 24 to be extended out of the housing to whatever length is desired and to be retained in that position. The latch also permits the power cord 24 to be released for rewinding upon the drum 30.

Located between the drum 30 and the bottom 18 is a brush assembly 34 which provides for an electrical interconnection between the rotating drum 30 and a fixed conductor 36.

The conductor 36 extends upwardly through the wall 20 into connection with a second brush assembly 38. The brush assembly 38 is located on a second shaft 40 that extends between and is journaled in the sidewalls of 14 and 16. Mounted for rotation arranged to receive an extension cord 44.

Also mounted on the second shaft 40 is the second latch and rewind assembly 46. The rewind assembly 46 is like the assembly 32 and provides for the return of the extension cord 44 to the reel and permits its retention at a desired length until released. Second latch and rewind assembly 46 includes resilient means such as coil spring 45 for storing energy when the second shaft rotates to feed the extension cord from the second reel means and for causing rotation of the second reel means in a direction to rewind the extension cord.

The shaft 40 is provided in one end with a suitable manual drive means such as a drive socket 47. The manual drive is provided so that the cord 44 can be reeled easily should the spring in the latch and rewind assembly fail.

Mounted on the second shaft 40 adjacent to the drum 42 is a gear 48 which forms part of timing means that is generally indicated by the reference character 50. The timing means 50 includes a gear 52 that is mounted on a level wind shaft 54.

The level wind shaft 54 extends between and is journaled in the side walls 14 and 16 of the housing 12. The arrangement of the timing means 50 is such that upon rotation of the second shaft 40 and the gear 48, the gear 52 is caused to rotate which in turn rotates the shaft 54.

The level wind shaft 54 forms part of a cord distribuutor means 55 which also includes a helical grooved portion 56 on the shaft 54 and a follower 58 which transverses the helical grooved portion 56 upon rotation of the level wind shaft 54. To control the horizontal travel of the follow 58, stops 60 and 62 have been provided on the level wind shaft 54 adjacent to each end of the helical grooved portion 56.

Figure 2:
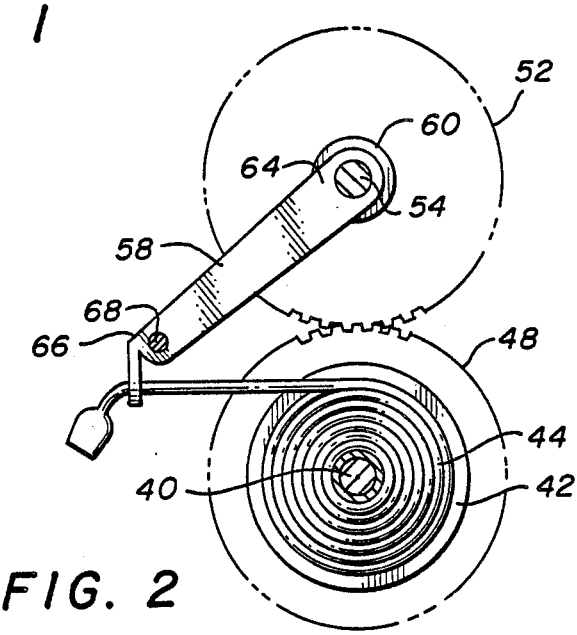
FIG. 2 is a transverse a cross-sectional view of the apparatus of FIG. 1 taken substantially along the line 2—2 of FIG. 1.

As may be seen in FIG. 2, the follower 58 is elongated having a portion 64 that encircles the shaft of the level wind shaft 54 and an outer or cord guide portion 66 that is disposed over a guide rod 68. As shown in FIG. 1, the guide rod 68 also extends between the sidewalls 14 and 16. This arrangement prevents the follower 58 from rotating and thus causes its reciprocating, horizontal travel along the helical grooved portion 56 of the shaft 54.

The follower 58 encircles the extension cord 44 so that as the extension cord is reeled in, the follower 58 moves along the shaft 54 distributing the cord 44 in a substantially uniform manner along the drum 42.

OPERATION OF THE PREFERRED EMBODIMENT

With the apparatus 10 substantially in the condition illustrated in FIGS. 1 and 2, that is, with the extension cord 44 reeled on the second drum 42 and the power cord 24 reeled on the drum 30, the apparatus 10 is in condition for operation. The housing 12 will be located convenient to a power outlet and the power cord 24 extended so that the plug 26 can be inserted in a power socket (not shown). Since the reel means 22 is provided for the power cord 24, the power cord 24 need only be extended adequately to reach to power socket.

The extension cord 44 is then pulled from the drum 42 until the desired length of cord has been extended from the housing 12. When this has been accomplished, the latch which forms part of the latch and return assembly 46 retains the drum 42 in the desired position. Additional power cord 44 can be pulled from the housing 12 or, alternatively, less cord can be exposed by the return action of the spring (not shown) of the latch and return assembly 46 rotating the drum 42 to rewind the cord 44.

One of the difficulties in using extension cords is their tendency to become tangled. This is particularly true where relatively long extension cords, for example, one hundred foot cords, are utilized. The provision of the level wind means 53 permits the longer cords to be easily and quickly unreeled as well as permitting their rewinding with no tangles.

Due to the uniformity of rewinding afforded by the distributor means 55 long extension cords may be easily stored in a relatively small space. As the extension cord 44 is rewound on the drum 42 by action of the spring, the gear 48 drives the gear 52 of the causing rotation of the level wind shaft 54. As the shaft 54 rotates, the follower 58 is caused to reciprocate along the grooved portion 56 of the shaft 54 between the stops 60 and 62.

As the follower 58 tranverses, the extension cord 44 is carried therewith positioning the cord uniformly on the drum 42.

From the foregoing, it will be appreciated that the extension cord apparatus of this invention provides a means for easily and conveniently storing unreeling and reeling long extension cords as well as providing an adaptable length power cord or pig tail which is also conveniently stored within the apparatus. The apparatus prevents the tangling of long extension cords and permits their storage in a small space due to the substantially uniform disposition of the extension cord on its drum.

Having described but a single embodiment of the invention, it will be appreciated that many changes and modifications can be made thereto without departing from the spirit or scope of the invention.

What is claimed:

1. Improved electric extension cord storage apparatus including:
   a hollow housing;
   first reel means including a shaft journaled in said housing and a drum mounted on said saft for receiving a power cord;
   second reel means including a second shaft journaled in said housing and a second drum on said second shaft for receiving said extension cord;
   means in said housing for electrically interconnecting said power cord and extension cord;
   level wind means including a level wind shaft having left and right-hand helical grooves therein;
   a follower mounted for reciprocating movement along said level wind shaft and having said extension cord passing therethrough;
   a gear mounted on and rotatable with said second shaft;
   a gear mounted on and rotatable with said level wind shaft is mesh with said gear on said second shaft causes rotation of said level wind shaft whereby rotation of said second shaft causes rotation of said level wind shaft and reciprocation of said follower to distribute said extension cord substantially uniformly along said second drum; and
   resilient means for storing energy when said second shaft rotates to feed said extension cord from said second reel means and for causing rotation of said second reel means in a direction to rewind said extension cord.

* * * * *